No. 688,649. Patented Dec. 10, 1901.
C. H. KAYSER.
ELECTRIC ARC LAMP.
(Application filed Mar. 5, 1901.)
(No Model.) 2 Sheets—Sheet 1.
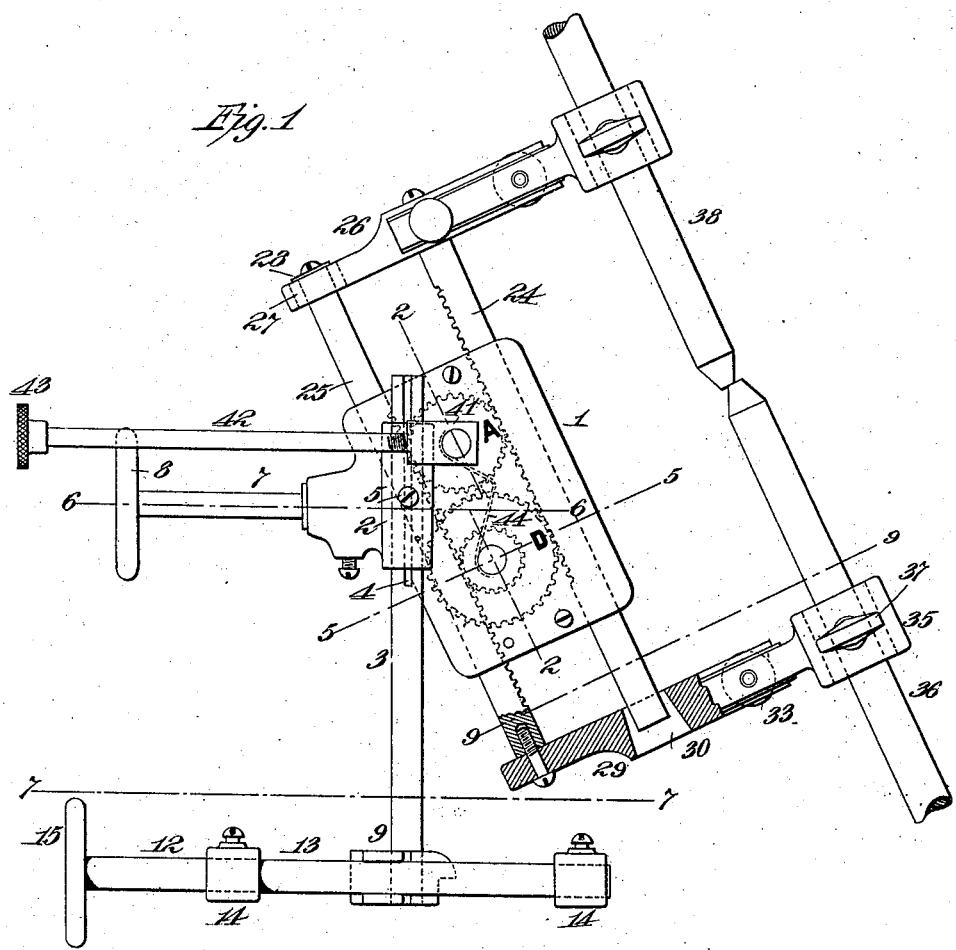
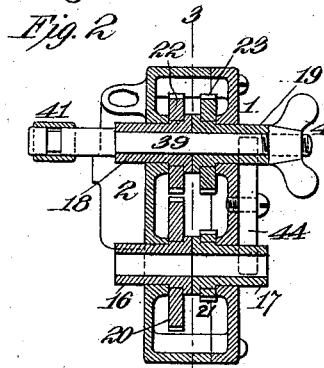
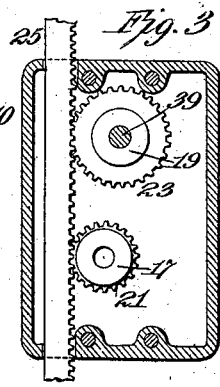
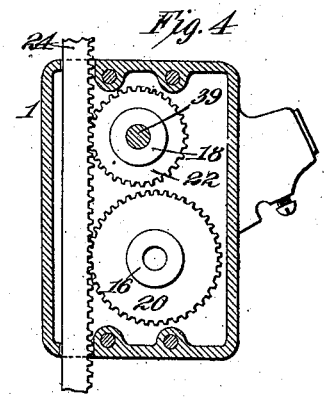
Witnesses:
Jas. F. Coleman
Jno. R. Taylor
Inventor
Charles H. Kayser
by Dyer Edmonds & Dyer
Att'ys.
THE NORRIS PETERS CO., PHOTO-LITHO., WASHINGTON, D. C.

No. 688,649. Patented Dec. 10, 1901.
C. H. KAYSER.
ELECTRIC ARC LAMP.
(Application filed Mar. 5, 1901.)
(No Model.) 2 Sheets—Sheet 2.
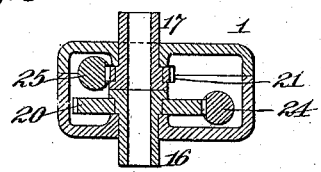
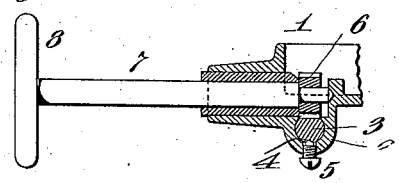
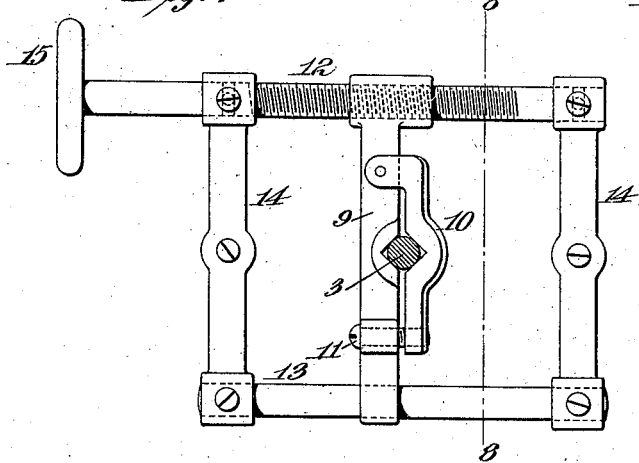
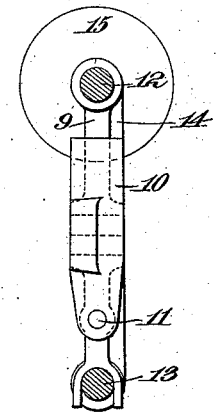
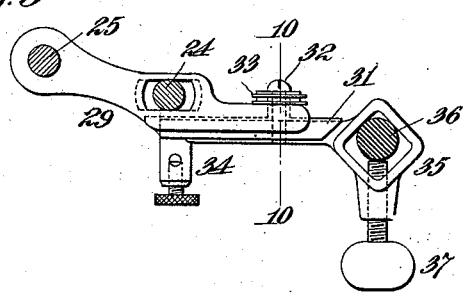
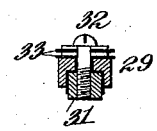
Witnesses:
Jas. F. Coleman
Jno. R. Taylor
Inventor
Charles H. Kayser
by Dyer Edmonds & Dyer
Att'ys.

UNITED STATES PATENT OFFICE.

CHARLES H. KAYSER, OF ORANGE, NEW JERSEY, ASSIGNOR TO EDISON MANUFACTURING COMPANY, OF ORANGE, NEW JERSEY, A CORPORATION OF NEW JERSEY.

ELECTRIC-ARC LAMP.

SPECIFICATION forming part of Letters Patent No. 688,649, dated December 10, 1901.

Application filed March 5, 1901. Serial No. 49,838. (No model.)

*To all whom it may concern:*

Be it known that I, CHARLES H. KAYSER, a citizen of the United States, residing at Orange, in the county of Essex and State of New Jersey, have invented a certain new and useful Improvement in Arc-Lamps, of which the following is a description.

My invention relates to various new and useful improvements in electric-arc lamps which are designed especially for use in connection with kinetoscopes, stereopticons, and similar projecting apparatus; and my object generally is to improve and simplify the construction of such lamps and to make them equally adapted for use with alternating and direct currents.

In order that the invention may be better understood, attention is directed to the accompanying drawings, forming part of this specification, and in which—

Figure 1 is a side view, partly in section, of the improved lamp; Fig. 2, a section on the line 2 2 of Fig. 1; Fig. 3, a section on the line 3 3 of Fig. 2 looking toward the right; Fig. 4, a section on the same line looking toward the left; Fig. 5, a section on the line 5 5 of Fig. 1; Fig. 6, a section on the line 6 6 of Fig. 1; Fig. 7, a section on the line 7 7 of Fig. 1; Fig. 8, a section on the line 8 8 of Fig. 7; Fig. 9, a section on the line 9 9 of Fig. 1, and Fig. 10 a section on the line 10 10 of Fig. 9.

In all of the above views corresponding parts are represented by the same numerals of reference.

A sectional casing 1 is formed at its side with an integral sleeve 2, which slides on a vertical rack 3. This rack is formed at one side with a guideway 4, with which a screw 5 engages to prevent the sleeve 2 from moving radially with respect to the rack. The teeth of the rack, as shown, are engaged by a pinion 6 on a vertical adjustment-shaft 7, having a hand-wheel 8 at its end. By turning the hand-wheel the casing carrying the carbons will be vertically adjusted, as explained, to effect a corresponding adjustment of the arc as a whole.

The lower end of the rack 3 is clamped against a traveler-rod 9 by means of a pivoted latch 10, operated by a screw 11. The traveler-rod at one end is threaded onto a screw 12 and at the other end is forked and rests upon a guide-rod 13. Two connecting-arms 14 14 connect the guide-rod 13 with the screw 12, as shown. By operating the screw 12 by a hand-wheel 15 the traveler-rod 9 will be moved horizontally back and forth to adjust the arc as a whole toward or away from the projecting-lens.

Mounted in the casing 1 and in line with each other are two pairs of sleeves 16 17 and 18 19, respectively, which sleeves, as shown, project outside of the casing. The sleeve 16 is provided with a spur-gear 20, keyed thereon, and the sleeve 17 is provided with a spur-gear 21, also keyed thereon, but of half the diameter of the spur-gear 20. The sleeves 18 and 19 are provided with spur-gears 22 and 23, respectively, keyed thereon and of the same diameter. As shown in dotted lines in Fig. 1 and also in Figs. 3 and 4, the sleeves 18 and 19 are mounted out of line with the sleeves 16 and 17, so that the periphery of the spur-gear 22 will be in line with the spur-gear 20 and the periphery of the spur-gear 23 will be in line with the periphery of the spur-gear 21.

A positive-carbon rack 24 is vertically movable in and with respect to the casing 1 and is maintained in engagement with the gears 20 and 22, and a negative-carbon rack 25 is correspondingly mounted and engages the gears 21 and 23. The positive-carbon rack 24 carries an arm 26 at its upper end, which arm extends over the negative-carbon rack and is provided with an opening 27 therein, (see dotted lines, Fig. 1,) through which the negative-carbon rack extends, the latter rack being provided with a washer 28 at its upper end to prevent the rack from passing entirely out of said opening. The negative-carbon rack 25 carries at its lower end an arm 29 and is provided with an opening 30, in which the positive-carbon rack 24 may work. The construction of the arms 26 and 29 is substantially identical, and the latter will be described, reference being had to Figs. 9 and 10, showing details.

The arm 29 is provided with a channel in its side, in which is mounted a bar 31, insulated from the arm, as shown, and held in place by a screw 32, insulated by mica rivets 33. The bar 31 carries a binding-post 34, to which the negative wire is connected, and at its end is formed with a rectangular head 35 for receiving the negative carbon 36, held in place by a clamping-screw 37. The positive carbon 38 is carried in a similar head on a bar mechanically connected to but electrically insulated from the arm 26.

When the lamp is used for alternating currents, it is necessary, if the arc is to be maintained in a constant position, that the carbons should be fed equally toward and away from each other; but when used with a direct current obviously the positive carbon should partake of double the movement of the negative carbon. When, therefore, a feed movement is given the racks 24 and 25 by simultaneously actuating the spur-gears 22 and 23, said racks will be moved in opposite directions to the same extent, while if said racks are moved by rotating the spur-gears 20 and 21 the positive carbon will partake of double the movement of the negative carbon. In order to actuate either set of spur-gears, I make use of a removable key 39, which is arranged to be engaged with the sleeves 16 17 or 18 19, as the case may require. In the drawings I illustrate the key as being in engagement with the latter sleeves, which will be clamped together, so as to rotate in unison, by a clamping-nut 40 on said key. The key is operated in any suitable way, but preferably by being provided at its end with a sleeve 41, into which the end of an operating-shaft 42 is screwed, said shaft having a thumb-wheel 43 at its other end. By turning the thumb-wheel 43 the other end of the shaft 42 will be engaged with the key 39 so as to be locked by the same, whereupon the shaft 42 may be moved up or down, so as to positively rotate the key, and thereby partially rotate either set of spur-gears with which the key may be at the time in coöperation. When the shaft 42 has been moved down or up as far as practicable in the feed movement, it is again partially rotated, so as to release the key, moved to its original position, and reversely rotated to again engage the key, whereupon the feed movements can be continued. In practice these operations can be very readily performed by a single operator, who can in addition easily focus the lamp with respect to the projecting-lenses by operating the hand-wheels 15 and 8.

In order to prevent the carbons from accidentally moving after they have been properly adjusted, a leaf-spring 44 is preferably used, which frictionally engages the sleeves 17 and 19, respectively, so as to impose a drag on the rotary movements of the spur-gears.

Having now described my invention, what I claim as new therein, and desire to secure by Letters Patent, is as follows:

1. In an electric-arc lamp the combination with a rotatable adjusting-screw, a guide-rod mounted parallel therewith, connecting-arms extending between the guide-rod and said adjusting-screw and having bearings in which the adjusting-screw is mounted and a traveler-rod operated by the adjusting-screw at one end and with its other end in engagement with the guide-rod, of a stationary vertical rack removably carried by the traveler-rod and carbon carrying and adjusting mechanism adjustably supported by said vertical rack, substantially as set forth.

2. In an electric-arc lamp, the combination of a casing, a pair of spur-gears mounted in said casing and operating in unison, a carbon-rack engaged and actuated by each of said spur-gears, an operating-handle for operating said gears, and means for locking and unlocking said handle to and from the gears, substantially as set forth.

3. In an electric-arc lamp, the combination of a casing, two sleeves rotatably mounted in said casing in line with each other, a spur-gear on each of said sleeves, a carbon-rack engaging each spur-gear, a removable key engaging said sleeves to clamp them together, and an operating-handle for operating said key, substantially as set forth.

4. In an electric-arc lamp, the combination of a casing, two sleeves rotatably mounted in said casing in line with each other, a spur-gear on each of said sleeves, a carbon-rack engaging each spur-gear, a removable key engaging said sleeves to clamp them together, an operating-handle for operating said key, and means for engaging or disengaging the handle to or from the key, substantially as set forth.

5. In an electric-arc lamp adapted for use with direct and alternating currents, the combination of a casing, two carbon-racks movable with respect to said casing, two sets of adjusting mechanisms engaging said racks and adapted one to move the racks for alternating currents and the other to move the racks for direct currents, and means for operating either set of adjusting mechanism, substantially as set forth.

6. In an electric-arc lamp adapted for use with direct and alternating currents, the combination of a casing, two pairs of spur-gears mounted in said casing, the spur-gears of one pair being of the same diameter and of the other pair of different diameters, a carbon-rack engaging one of the gears of both sets, and means for rotating either pair of gears, substantially as set forth.

7. In an electric-arc lamp adapted for use with direct and alternating currents, the combination of a casing, two pairs of spur-gears mounted in said casing, the spur-gears of one pair being of the same diameter and of the other pair of different diameters, a carbon-rack engaging one of the gears of both sets, and a removable key adapted to engage either pair of gears for operating them, substantially as set forth.

8. In an electric-arc lamp adapted for use with direct and alternating currents, the combination of a casing, two pairs of spur-gears mounted in said casing, the spur-gears of one pair being of the same diameter and of the other pair of different diameters, a carbon-rack engaging one of the gears of both sets, a removable key adapted to engage either pair of gears for operating them, and a handle for operating said key, substantially as set forth.

9. In an electric-arc lamp adapted for use with direct and alternating currents, the combination of a casing, two pairs of spur-gears mounted in said casing, the spur-gears of one pair being of the same diameter and of the other pair of different diameters, a carbon-rack engaging one of the gears of both sets, a removable key adapted to engage either pair of gears for operating them, a handle for operating said key, and means for locking or unlocking the handle to or from the key, substantially as set forth.

10. In an electric-arc lamp adapted for use with direct and alternating currents, the combination of a casing, two pairs of sleeves mounted in said casing, the sleeves of each pair being in line with each other, two pairs of spur-gears carried by said sleeves, the gears of one pair being of the same diameter and of the other pair of different diameters; a carbon-rack engaging one of the spur-gears of both pairs, and means for operating either pair of sleeves, substantially as set forth.

11. In an electric-arc lamp adapted for use with direct and alternating currents, the combination of a casing, two pairs of sleeves mounted in said casing, the sleeves of each pair being in line with each other, two pairs of spur-gears carried by said sleeves, the gears of one pair being of the same diameter and of the other pair of different diameters, a carbon-rack engaging one of the spur-gears of both pairs, and a key adapted to be engaged with either pair of sleeves for operating them, substantially as set forth.

12. In an electric-arc lamp adapted for use with direct and alternating currents, the combination of a casing, two pairs of sleeves mounted in said casing, the sleeves of each pair being in line with each other, two pairs of spur-gears carried by said sleeves, the gears of one pair being of the same diameter and of the other pair of different diameters, a carbon-rack engaging one of the spur-gears of both pairs, a key adapted to be engaged with either pair of sleeves for operating them, and a thumb-nut on the key for clamping the engaged sleeves together so that they turn in unison, substantially as set forth.

13. In an electric-arc lamp adapted for use with direct and alternating currents, the combination of a casing, two pairs of sleeves mounted in said casing, the sleeves of each pair being in line with each other, two pairs of spur-gears carried by said sleeves, the gears of one pair being of the same diameter and of the other pair of different diameters, a carbon-rack engaging one of the spur-gears of both pairs, a key adapted to be engaged with either pair of sleeves for operating them, and a handle for operating said key, substantially as set forth.

14. In an electric-arc lamp adapted for use with direct and alternating currents, the combination of a casing, two pairs of sleeves mounted in said casing, the sleeves of each pair being in line with each other, two pairs of spur-gears carried by said sleeves, the gears of one pair being of the same diameter and of the other pair of different diameters, a carbon-rack engaging one of the spur-gears of both pairs, a key adapted to be engaged with either pair of sleeves for operating them, a handle for operating said key, and means for locking or unlocking the handle to or from the key, substantially as set forth.

This specification signed and witnessed this 28th day of February, 1901.

CHARLES H. KAYSER.

Witnesses:
HARRY F. MILLER,
PETER WEBER.